United States Patent
Lee et al.

(10) Patent No.: US 6,339,281 B2
(45) Date of Patent: Jan. 15, 2002

(54) METHOD FOR FABRICATING TRIODE-STRUCTURE CARBON NANOTUBE FIELD EMITTER ARRAY

(75) Inventors: Hang-woo Lee, Kyungki-do; Nae-sung Lee; Yong-soo Choi, both of Seoul; Jong-min Kim, Kyungki-do, all of (KR)

(73) Assignee: Samsung SDI Co., Ltd. (KR)

(*) Notice: Subject to any disclaimer, the term of this patent is extended or adjusted under 35 U.S.C. 154(b) by 0 days.

(21) Appl. No.: 09/754,148

(22) Filed: Jan. 5, 2001

(30) Foreign Application Priority Data

Jan. 7, 2000 (KR) ................................ 00-668

(51) Int. Cl.$^7$ ............................. H01J 1/304; H01J 9/02
(52) U.S. Cl. .................. 313/309; 313/311; 313/336; 313/351; 445/24
(58) Field of Search ..................... 313/309, 311, 313/336, 351; 445/24; 438/274

(56) References Cited

U.S. PATENT DOCUMENTS

| | | | |
|---|---|---|---|
| 5,773,834 A | 6/1998 | Yamamoto et al. | |
| 5,973,444 A | * 10/1999 | Xu et al. | ............... 313/309 |
| 6,062,931 A | * 5/2000 | Chuang et al. | ............... 445/24 |
| 6,097,138 A | 8/2000 | Nakamoto | |

FOREIGN PATENT DOCUMENTS

JP 10012124 1/1998

OTHER PUBLICATIONS

L.C. Qin, D. Zhou, A.R. Krauss, and D.M. Gruen Growing Carbon Nanotubes by Microwave Plasma–Enhanced Chemical Vapor Deposition, Applied Physics Letters, vol. 72, No. 26, Jun. 1998, pp. 3437–3439.

* cited by examiner

*Primary Examiner*—Richard Elms
*Assistant Examiner*—Beth E. Owens
(74) *Attorney, Agent, or Firm*—Burns, Doane, Swecker & Mathis, L.L.P.

(57) ABSTRACT

A method for fabricating a triode field emitter array using carbon nanotubes having excellent electron emission characteristics is provided. In the method for fabricating a triode-structure carbon nanotube field emitter array, a catalyst layer is formed on a cathode electrode without forming a base layer, and carbon nanotubes are grown on the catalyst layer using a Spind't process. In this method, a non-reactive layer is formed on a catalyst layer outside the micro-cavity such that the carbon nanotubes can be grown only on the catalyst within the micro-cavity. Accordingly, even through a separation layer is etched and removed, since carbon nanotubes do not exist outside the micro-cavity, it does not happen that carbon nanotubes are drifted into the micro-cavities. Therefore, the fabrication yield is increased, and the fabrication cost is decreased.

15 Claims, 8 Drawing Sheets

METHOD FOR FABRICATING TRIODE-STRUCTURE CARBON NANOTUBE FIELD EMITTER ARRAY

BACKGROUND OF THE INVENTION

1. Field of the Invention

The present invention relates to a method for fabricating triode field emitter array using carbon nanotubes having excellent electron emission characteristics.

2. Description of the Related Art

In a conventional field emission display (FED), when a strong electric field is applied through gates to a Spindt's field emitter array (FEA), which is formed of a metal such molybdenum (Mo) or a semiconductor material such as silicon (Si), that is, to microtips arranged at regular intervals, electrons are emitted from the microtips. The emitted electrons are accelerated toward an anode, to which voltage (for example, several hundred to several thousand volts) is applied, and collide with phosphors with which the anodes are coated, thereby emitting light. Because the work function of a metal or a semiconductor material used for the microtips of a conventional FED is large, the gate voltage for electron emission must be very high. Residual gas particles in vacuum collide with electrons and are thus ionized. Because the microtips are bombarded with these gas ions, the microtips as an electron emission source may break. Moreover, since particles are separated from the phosphors colliding with electrons and pollute the microtips, the performance of the electron emission source may be deteriorated. These problems may reduce the performance and life time of the FEA. To overcome these problems, instead of a metal or a semiconductor material, carbon nanotubes having a low electron emission voltage and an excellent chemical stability is used for electron emitters. In this case, the performance and life time of the FEA can be improved.

Arc discharge and laser ablation is widely used in deposition of carbon nanotubes, but these methods are not suitable for mass production of carbon nanotubes at a low cost, and structure control is difficult in these methods. To overcome these problems, chemical vapor deposition has been developed. Representative chemical vapor deposition methods include thermal chemical vapor deposition (CVD) (Appl. Phys. Lett. 67, 2477, 1995) MPECVD (App. Phys. Lett. 72, 3437, 1998) and ion beam irradiation (Appl. Phys. Lett. 69, 4174, 1996).

While the threshold electrical field of a diamond film for electron emission, which has been highlighted as a material of an electron emission source, is about 10 V/μm, carbon nanotubes have a characteristic in which electrons are easily emitted even at an electrical field of 1 V/μm or less. Accordingly, carbon nanotubes have been touted as the next generation material of an electron emission source.

Figure 1:
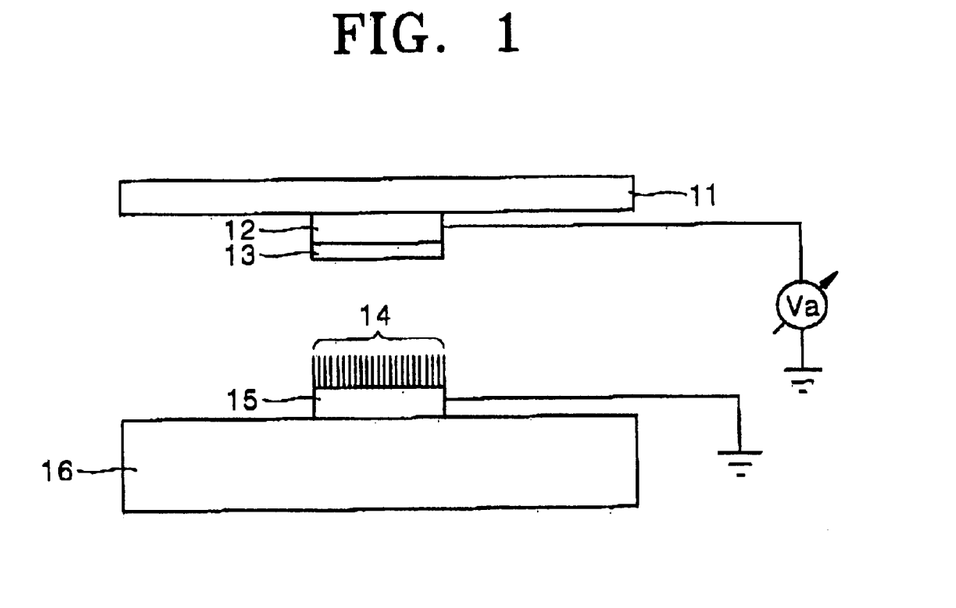
FIG. 1 is a schematic vertical sectional view of a conventional diode field emission display (FED) using carbon nanotubes.

FIG. 1 is a schematic sectional view illustrating the structure of a conventional FED using carbon nanotubes. As shown in FIG. 1, the conventional FED using carbon nanotubes includes a front substrate 11 and a rear substrate 16 which face each other, an anode electrode 12 and a cathode electrode 15 which are formed on the surfaces of the two substrates 11 and 16 facing each other, respectively, phosphor 13 with which the anode electrode 12 is coated and carbon nanotubes 14 deposited on the cathode electrode 15, thereby having a diode structure.

It is crucial to deposit carbon nanotubes on a wide area at a low cost using a method capable of controlling the carbon nanotubes in manufacturing FEDs using carbon nanotubes. It is considered that chemical vapor deposition should be used to achieve the above purpose. Similarly to arc discharge or laser ablation, chemical vapor deposition uses a transition metal such as nickel (Ni) or iron (Fe) or silicide such as $CoSi_2$ as a catalyzer. Up to now, carbon nanotubes are not deposited on a structure of a predetermined pattern but have still been deposited randomly as in a diode structure. The diode structure can easily be manufactured by chemical vapor deposition because a layer such as an insulating layer or a gate shown in a triode structure is not necessary. However, it is difficult to control emitted electrons in a simple diode structure. This disturbs the required performance of a display.

A field emitter using controlled carbon nanotubes is disclosed in U.S. Pat. No. 5,773,834. In this patent, a field emitter is formed in a triode structure using a grid of a net shape as gate electrodes so that it can be expected that emitted electrons can be controlled to some extent. However, the structure of this field emitter is not simple enough to be easily manufactured by chemical vapor deposition.

SUMMARY OF THE INVENTION

To solve the above problem, an object of the present invention is to provide a method for fabricating a triode-structure carbon nanotube field emitter array, in which an electron emission source is fabricated by applying a Spindt process to carbon nanotubes.

To achieve the above object, in one embodiment, the present invention provides a method for fabricating a triode-structure carbon nanotube field emitter array. The method includes the steps of (a) forming a separation layer on a gate electrode using slant deposition in a structure in which a cathode electrode, a gate insulation layer and the gate electrode are sequentially formed on a cathode glass substrate, a gate opening is formed on the gate electrode, a micro-cavity corresponding to the opening is formed in the gate insulation layer; (b) forming a catalyst layer on the cathode electrode within the micro-cavity, the catalyst layer acting as a catalyst in growing carbon nanotubes; (c) performing slant deposition on the catalyst layer, thereby forming a non-reactive layer for preventing carbon nanotubes from growing on the catalyst layer outside the micro-cavity; (d) growing carbon nanotubes on the catalyst layer within the micro-cavity; and (e) removing the separation layer.

In the step (a), the gate insulation layer is formed by depositing $SiO_2$ or $Si_3N_4$ to a thickness of 5–10 μm, and the diameter of the gate opening is 5–10 μm. In the step (b), the catalyst layer is formed by depositing Ni or Co. In the step (c), the non-reactive layer is formed of at least one material selected from among Cr, W, Al, Mo and Si. In the step (d), the carbon nanotubes are grown by an arc discharge method or chemical vapor deposition methods.

In another embodiment, the present invention provides a method for fabricating a triode-structure carbon nanotube field emitter array. The method includes the steps of (a) forming a separation layer on a gate electrode using slant deposition in a structure in which a cathode electrode, a gate insulation layer and the gate electrode are sequentially formed on a cathode glass substrate, a gate opening is formed on the gate electrode, a micro-cavity corresponding to the gate opening is formed in the gate insulation layer; (b) performing slant deposition of the cathode electrode within the micro-cavity, thereby forming a base layer having a truncated cone shape within the micro-cavity; (c) forming a catalyst layer on the base layer, the catalyst layer acting as a catalyst in growing carbon nanotubes; (d) performing slant deposition on the catalyst layer, thereby forming a non-reactive layer for preventing carbon nanotubes from growing on the catalyst layer outside the micro-cavity; (e) growing carbon nanotubes on the catalyst layer within the micro-cavity; and (f) removing the separation layer.

In the step (a), the gate insulation layer is formed by depositing $SiO_2$ or $Si_3N_4$ to a thickness of 5–10 μm, and the diameter of the gate opening is 5–10 μm. In the step (b), the base layer is formed of at least one material selected from among Au, Pt and Nb. In the step (c), the catalyst layer is formed by depositing Ni or Co. In the step (d), the non-reactive layer is formed of at least one material selected from among Cr, W, Al, Mo and Si. In the step (e), the carbon nanotubes are grown by an arc discharge method or chemical vapor deposition methods.

BRIEF DESCRIPTION OF THE DRAWINGS

The above object and advantage of the present invention will become more apparent by describing in detail preferred embodiments thereof with reference to the attached drawings in which.

DETAILED DESCRIPTION OF THE INVENTION

Hereinafter, a method for fabricating a triode-structure carbon nanotube field emitter array according to the present invention will be described in detail with reference to the attached drawings.

First Embodiment

Figure 2A:
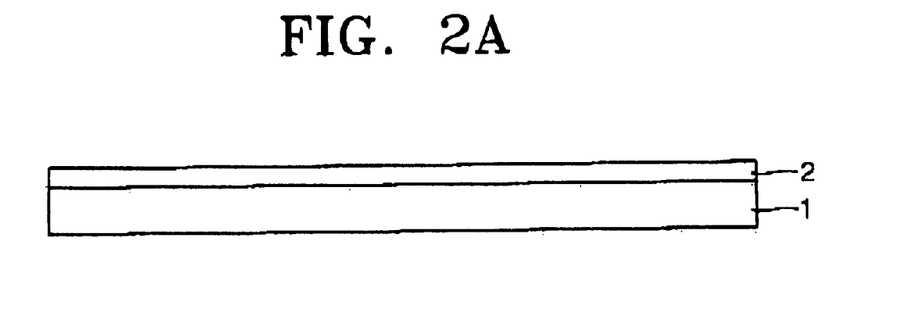
FIGS. 2A through 2H are sectional views illustrating a method for fabricating a triode-structure carbon nanotube field emitter array according to a first embodiment of the present invention.

A method for fabricating a triode-structure carbon nanotube field emitter array according to a first embodiment of the present invention will be described. Referring to FIG. 2A, a cathode electrode 2 is formed of a transparent electrode or a metal on a rear glass substrate 1.

Figure 2B:
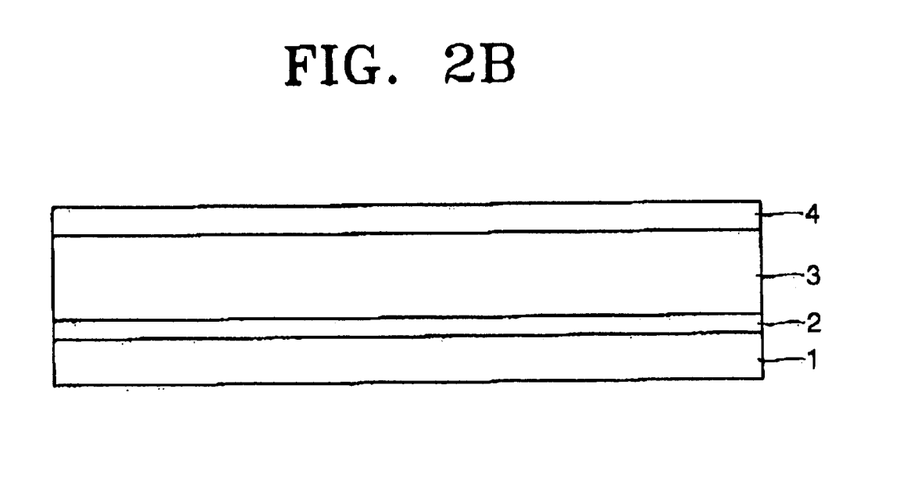

Referring to FIG. 2B, a gate insulating material such as $SiO_2$ or $Si_3N_4$ is deposited on the cathode electrode 2 to a thickness of 5–10 μm, thereby forming a gate insulation layer 3 for insulating the cathode electrode 2 from a gate electrode 4. The gate electrode 4 is formed on the gate insulation layer 3.

Figure 2C:
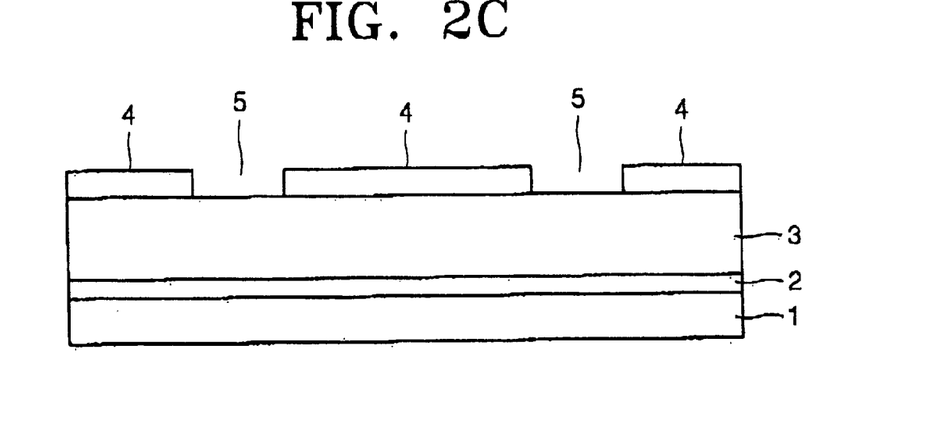

Referring to FIG. 2C, gate openings 5 are formed on the gate electrode 4 such that they have a diameter of about 5–10 μm considering the thickness of the gate insulation layer 3.

Figure 2D:
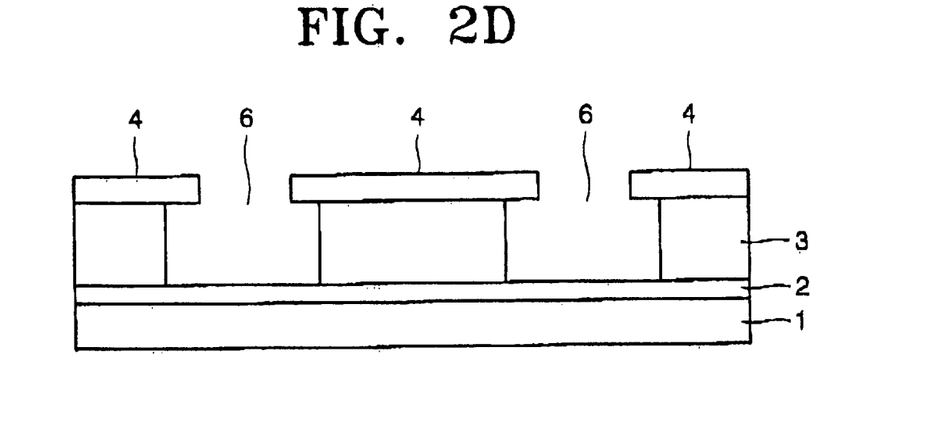

Referring to FIG. 2D, the gate insulation layer 3 is etched using the gate electrode 4 as a mask, thereby forming micro-cavities 6.

Figure 2E:
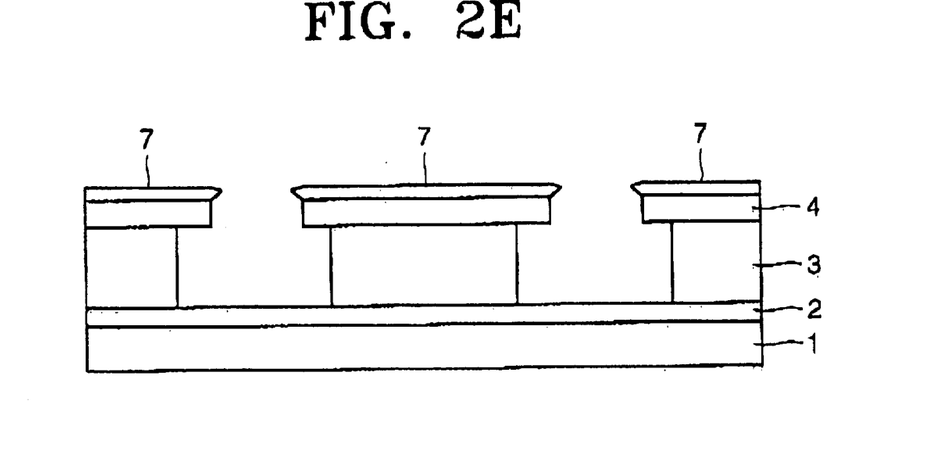

Referring to FIG. 2E, a separation layer (a sacrificial layer) 7 with a slant is deposited using directional deposition equipment.

Figure 2F:
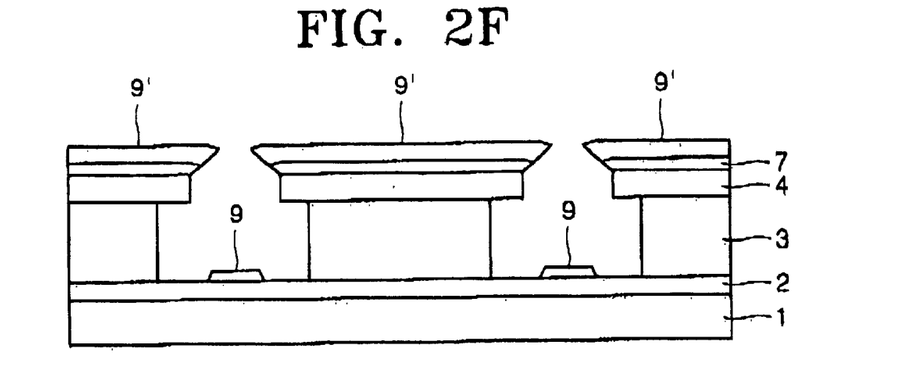

Referring to FIG. 2F, a material such as Ni or Co acting as a catalyst in growing carbon nanotubes is vertically deposited, thereby forming catalyst layers 9 and 9' on the bottom of the micro-cavities 6 and the surfaces of the separation layer 7.

Figure 2G:
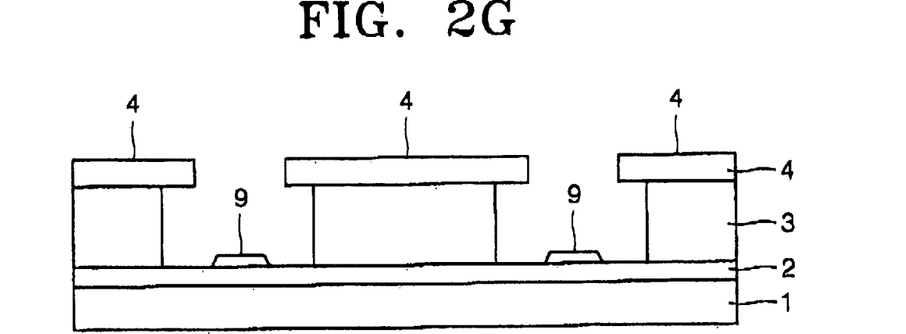

Referring to FIG. 2G, the separation layer 7 is separated, thereby removing the catalyst layer 9' formed on the separation layer 7.

Figure 2H:
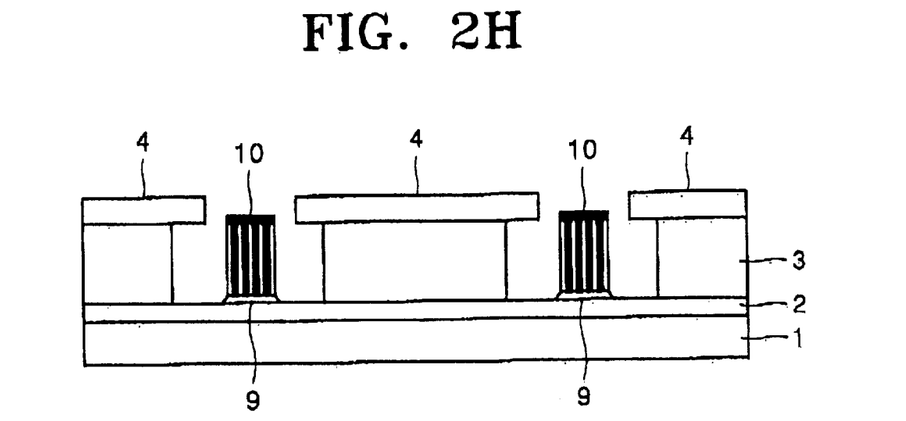

Referring to FIG. 2H, carbon nanotubes 10 are grown on the catalyst layer 9 formed on the bottom of the micro-cavities 6. Such partial growth of the carbon nanotubes 10 only on the catalyst layer 9 can be accomplished by performing a chemical vapor deposition (CVD) process without setting special process conditions. The carbon nanotubes 10 are usually grown on the catalyst layer 9 but may be formed on the gate electrode 4. With such an arrangement, the self-aligned carbon nanotubes 10 are formed in the micro-cavities 6 so that a triode-structure field emitter array can be obtained. However, carbon nanotubes which can be neglected in size or thickness are formed on the gate electrode 4. Schemes for preventing carbon nanotubes from growing on the gate electrode 4 will be described later in second and third embodiments.

In the second embodiment, a substrate obtained after performing the processes of FIGS. 2A through 2F described in the first embodiments is used. In the third embodiment, a substrate obtained after performing the steps of FIGS. 2A through 2E described in the first embodiments is used.

Second Embodiment

Figure 3A:
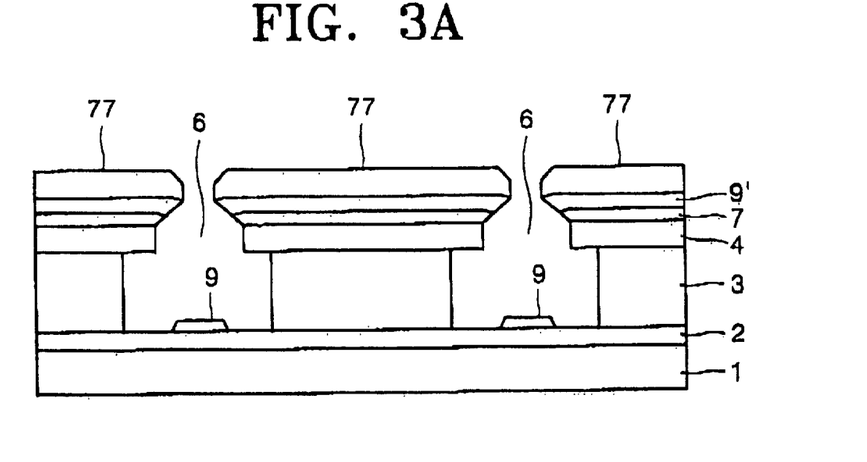
FIGS. 3A through 3C are sectional views illustrating a method for fabricating a triode-structure carbon nanotube field emitter array according to a second embodiment of the present invention.

After performing the steps of FIGS. 2A through 2F described in the first embodiment, as shown in FIG. 3A, a material such as Cr, W, Al, Mo or Si is slantingly deposited on the catalyst layer 9' using directional deposition equipment, thereby forming a non-reactive layer 77 for preventing the formation of carbon nanotubes on the catalyst layer 9' except the catalyst layer 9 formed within the micro-cavities 6.

Figure 3B:
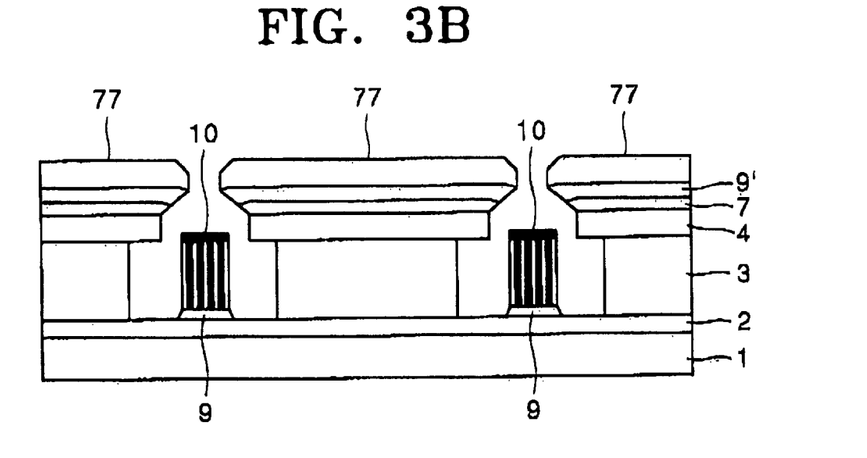

Referring to FIG. 3B, carbon nanotubes 10 are grown on the catalyst layer 9 using an arc discharge method or a CVD method. Here, carbon nanotubes are rarely grown on the non-reactive layer 77 due to the characteristics of the non-reactive layer 77.

Figure 3C:
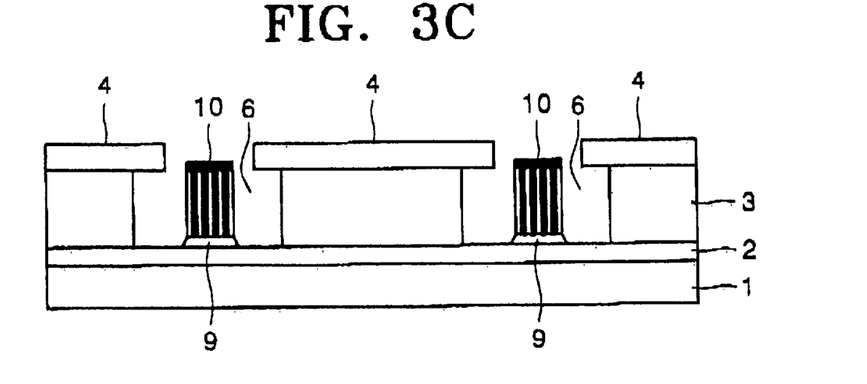

Referring to FIG. 3C, the separation layers 7 are removed, thereby removing the catalyst layers 9' and the non-reactive layers 77 on the separation layers 7. Accordingly, carbon nanotubes exist only within the micro-cavities 6. With such an arrangement, the self-aligned carbon nanotubes 10 are formed within the micro-cavities 6 so that a triode-structure field emitter array can be obtained.

Third Embodiment

Figure 4A:
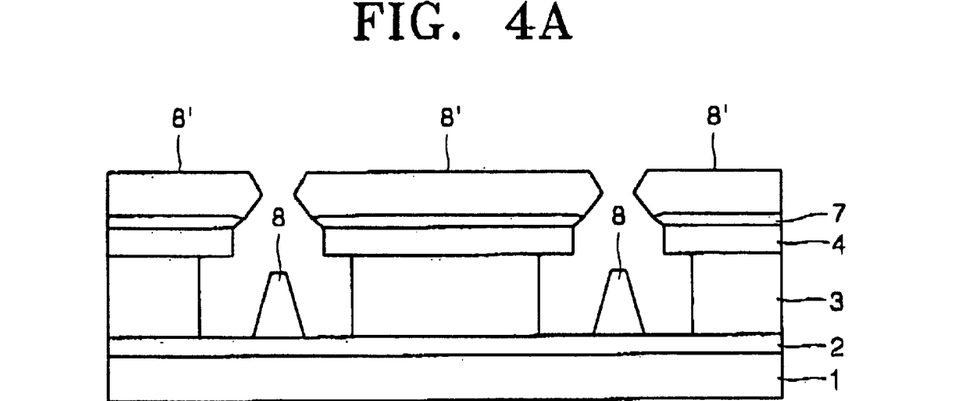
FIGS. 4A through 4E are sectional views illustrating a method for fabricating a triode-structure carbon nanotube field emitter array according to a third embodiment of the present invention.

After performing the steps of FIGS. 2A through 2E described in the first embodiment, as shown in FIG. 4A, a material such as Au, Pt or Nb having a good conductivity is deposited on the separation layer 7 and the bottoms of the micro-cavities 6, thereby forming base layers 8' and 8. The base layer 8 formed within the micro-cavities 6 are provided for the effective electrical contact between the cathode electrode 2 and carbon nanotubes 10 which will be obtained in a later step and for realizing the fine self-aligned structure of the carbon nanotubes 10 formed within the micro-cavities 6.

Figure 4B:
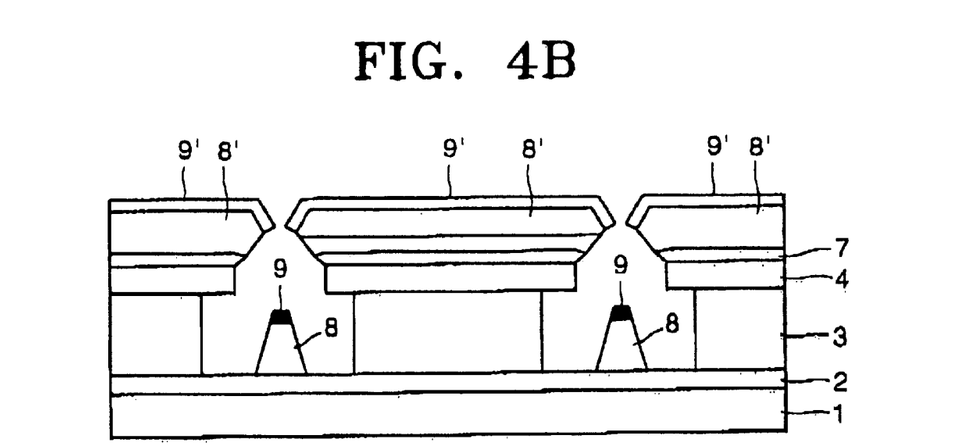

Referring to FIG. 4B, a material such as Ni or Co acting as a catalyst of the growth of carbon nanotubes is vertically deposited on the base layers 8 and 8', thereby forming catalyst layers 9 and 9'.

Figure 4C:
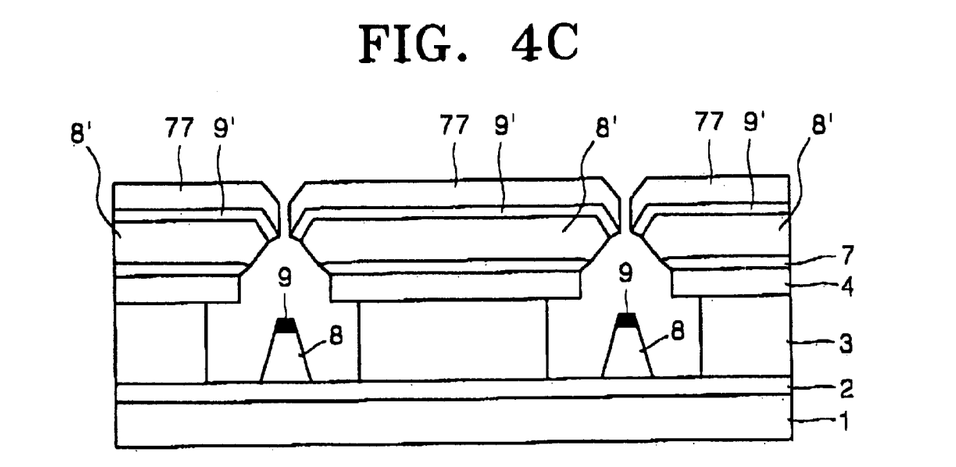

Referring to FIG. 4C, a material such as Cr, W, Al, Mo or Si is slantingly deposited on the catalyst layer 9' except the catalyst layer 9 formed within the micro-cavities 6 using directional deposition equipment, thereby forming a non-reactive layer 77.

Figure 4D:
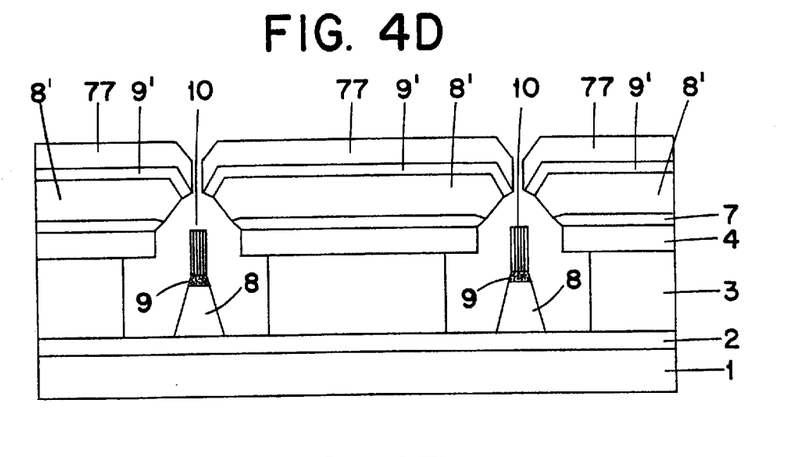
Figure 4E:
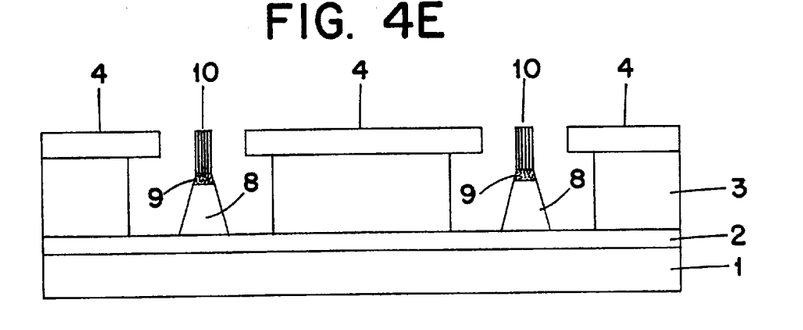

Referring to FIG. 4D, carbon nanotubes 10 are grown using an arc discharge method or a CVD method. Thereafter, the separation layer 7 is removed so that the base layer 8', the catalyst layer 9' outside the cavities 6 and the non-reactive layer 77 can be removed together with the separation layer 7. Consequently, as shown in FIG. 4E, the carbon nanotubes 10 self-aligned within the micro-cavities 6 can be obtained.

Figure 5:
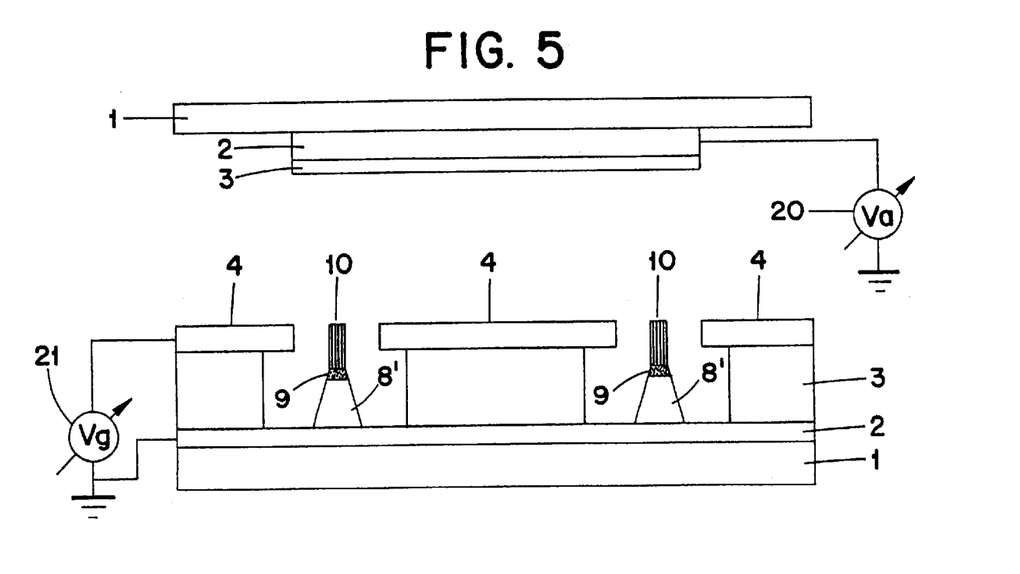
FIG. 5 is a schematic diagram illustrating a scheme for driving a triode-structure carbon nanotube field emitter array which is fabricated according to the first or second embodiment.
Figure 6:
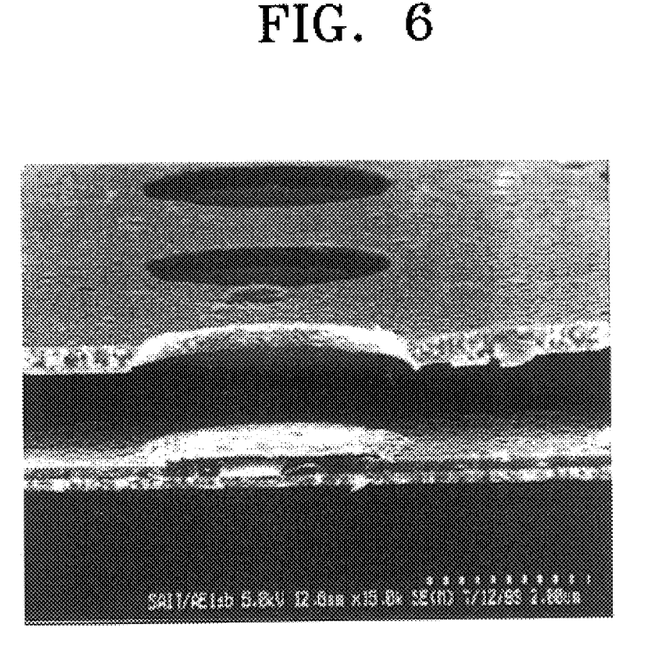
FIG. 6 is a SEM photograph illustrating a state in which a catalyst layer is formed on the bottom of a micro-cavity by a method for fabricating a triode-structure carbon nanotube field emitter array according to the present invention.
Figure 7:
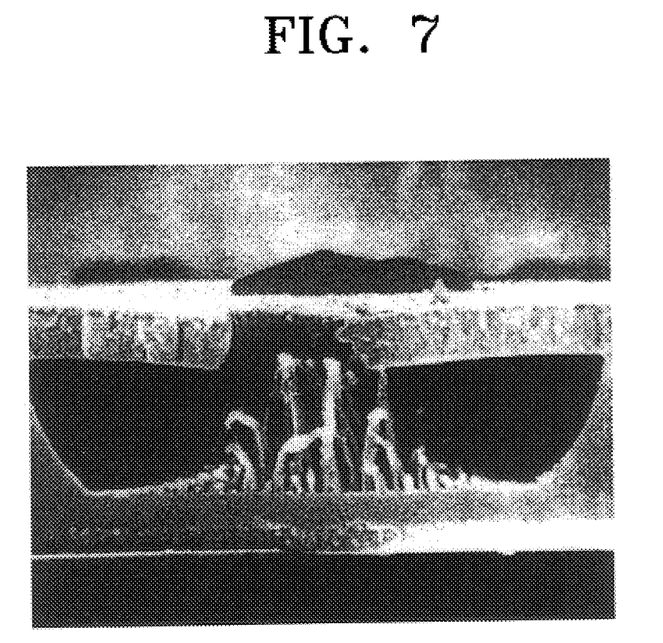
FIGS. 7 and 8 are SEM photographs illustrating states in which carbon nanotubes are grown on a catalyst layer by a method for fabricating a triode-structure carbon nanotube field emitter array according to the present invention.
Figure 8:
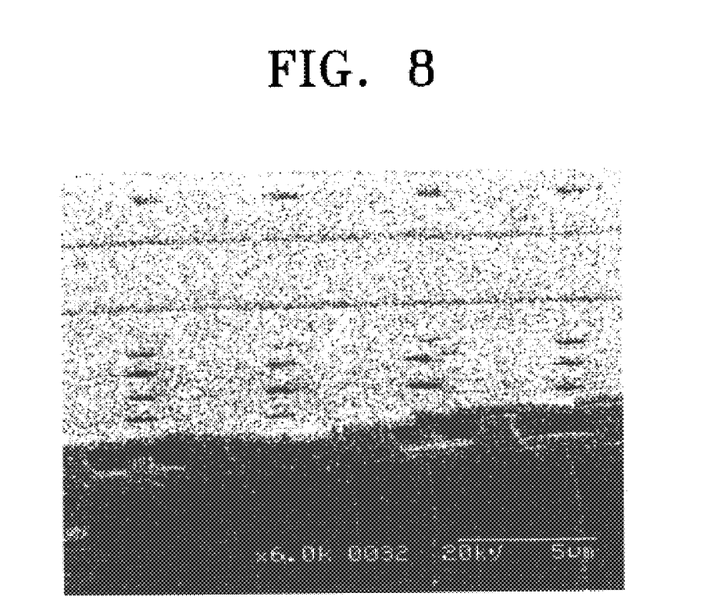

When a gate voltage (Vg) 21 and an anode voltage (Va) 20 are applied to a triode-structure field emitter array obtained through the above fabrication steps, as shown in FIG. 5, a stable triode current voltage can be obtained. FIG. 6 is a SEM photograph illustrating a state in which a catalyst layer is formed on the bottom of a micro-cavity among the fabrication steps described above. FIGS. 7 and 8 are SEM photographs illustrating states where carbon nanotubes are grown on the catalyst layer.

Figure 9:
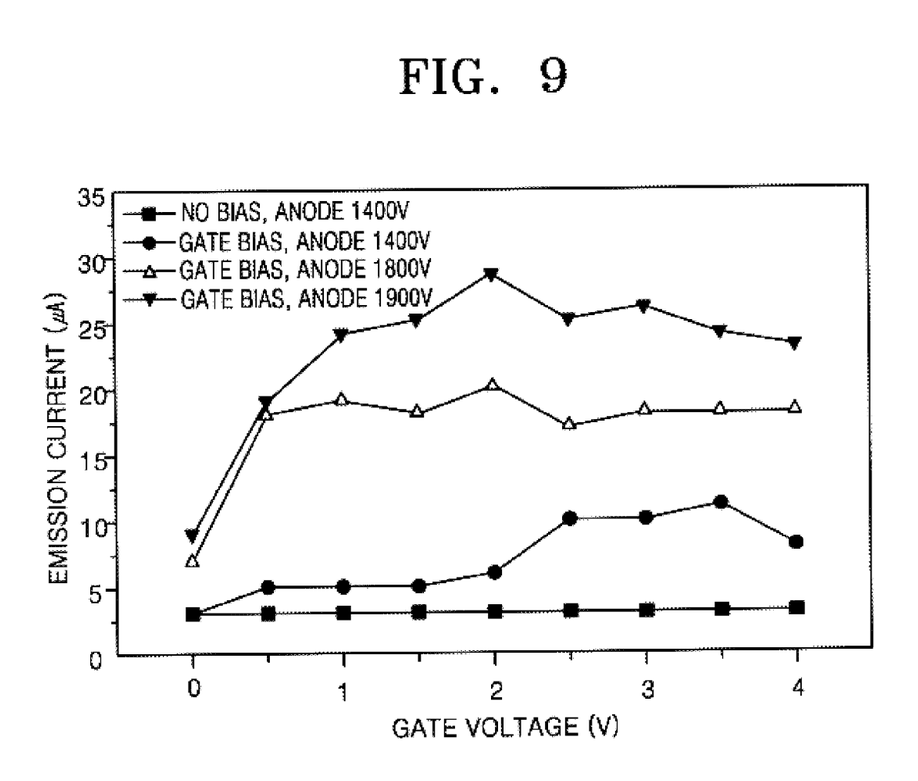
FIG. 9 is a graph illustrating changes in emission current depending on changes in the gate voltage of a triode-structure carbon nanotube field emitter array fabricated by a method according to the present invention.

FIG. 9 is a graph illustrating changes in emission current ($\mu$A) depending on changes in gate voltage in a triode-structure field emitter array obtained by a method of the present invention. Changes in emission current at individual anode voltages 1400 V, 1800 V and 1900 V are shown. A line at the lowermost in the graph indicates a case where a gate electrode is not biased.

As described above, in a method for fabricating a triode-structure carbon nanotube field emitter array, a catalyst layer is formed on a cathode electrode without forming a base layer, and carbon nanotubes are grown on the catalyst layer using a Spind't process. In this method of the present invention, a non-reactive layer is formed on a catalyst layer outside the micro-cavity such that the carbon nanotubes can be grown only on the catalyst within the micro-cavity. Accordingly, even though a separation layer is etched and removed, since carbon nanotubes do not exist outside the micro-cavity, it does not happen that carbon nanotubes are drifted into the micro-cavities. Therefore, the present invention increases the fabrication yield and decreases the fabrication cost.

What is claimed is:

1. A method for fabricating a triode-structure carbon nanotube field emitter array, the method comprising the steps of:
    (a) forming a separation layer on a gate electrode using slant deposition in a structure in which a cathode electrode, a gate insulation layer and the gate electrode are sequentially formed on a cathode glass substrate, a gate opening is formed on the gate electrode, a micro-cavity corresponding to the opening is formed in the gate insulation layer;
    (b) forming a catalyst layer on the cathode electrode within the micro-cavity, the catalyst layer acting as a catalyst in growing carbon nanotubes;
    (c) performing slant deposition on the catalyst layer, thereby forming a non-reactive layer for preventing carbon nanotubes from growing on the catalyst layer outside the micro-cavity;
    (d) growing carbon nanotubes on the catalyst layer within the micro-cavity; and
    (e) removing the separation layer.

2. The method of claim 1, wherein in the step (a), the gate insulation layer is formed by depositing $SiO_2$ or $Si_3N_4$ to a thickness of 5–10 $\mu$m, and the diameter of the gate opening is 5–10 $\mu$m.

3. The method of claim 1, wherein in the step (b), the catalyst layer is formed by depositing Ni or Co.

4. The method of claim 1, wherein in the step (c), the non-reactive layer is formed of at least one material selected from the group consisting of Cr, W, Al, Mo and Si.

5. The method of claim 1, wherein in the step (d), the carbon nanotubes are grown by an arc discharge method or a chemical vapor deposition method.

6. A method for fabricating a triode-structure carbon nanotube field emitter array, the method comprising the steps of:
    (a) forming a separation layer on a gate electrode using slant deposition in a structure in which a cathode electrode, a gate insulation layer and the gate electrode are sequentially formed on a cathode glass substrate, a gate opening is formed on the gate electrode, a micro-cavity corresponding to the gate opening is formed in the gate insulation layer;
    (b) performing slant deposition on the cathode electrode within the micro-cavity, thereby forming a base layer having a truncated cone shape within the micro-cavity;
    (c) forming a catalyst layer on the base layer; the catalyst layer acting as a catalyst in growing carbon nanotubes;
    (d) performing slant deposition on the catalyst layer, thereby forming a non-reactive layer for preventing carbon nanotubes from growing on the catalyst layer outside the micro-cavity;
    (e) growing carbon nanotubes on the catalyst layer within the micro-cavity; and
    (f) removing the separation layer.

7. The method of claim 6, wherein in the step (a), the gate insulation layer is formed by depositing $SiO_2$ or $Si_3N_4$ to a thickness of 5–10 $\mu$m, and the diameter of the gate opening is 5–10 $\mu$m.

8. The method of claim 6, wherein the step (b), the base layer is formed of at least one material selected from the group consisting of Au, Pt and Nb.

9. The method of claim 6, wherein in the step (c), the catalyst layer is formed by depositing Ni or Co.

10. The method of claim 6, wherein in the step (d), the non-reactive layer is formed of at least one material selected from the group consisting of Cr, W, Al, Mo and Si.

11. The method of claim 6, wherein in the step (e), the carbon nanotubes are grown by an arc discharge method or a chemical vapor deposition method.

12. A method for fabricating a triode-structure carbon nanotube field emitter array, the method comprising the steps of:

(a) forming a separation layer on a gate electrode using slant deposition in a structure in which a cathode electrode, a gate insulation layer and the gate electrode are sequentially formed on a cathode glass substrate, a gate opening is formed on the gate electrode, a micro-cavity corresponding to the gate opening is formed in the gate insulation layer;

(b) forming a catalyst layer on the separation layer and the cathode electrode within the micro-cavity, the catalyst layer acting as a catalyst in growing carbon nanotubes;

(c) removing the separation layer to remove the catalyst layer on the separation layer; and (d) growing carbon nanotubes on the catalyst layer within the micro-cavity.

13. The method of claim 12, wherein in the step (a), the gate insulation layer is formed by depositing $SiO_2$ or $Si_3N_4$ to a thickness of 5–10 $\mu$m, and the diameter of the gate opening is 5–10 $\mu$m.

14. The method of claim 12, wherein in the step (b), the catalyst layer is formed by depositing Ni or Co.

15. The method of claim 12, wherein in the step (d), the carbon nanotubes are grown by an arc discharge method or a chemical vapor deposition method.

* * * * *